United States Patent
Miyawaki et al.

(10) Patent No.: US 9,452,444 B2
(45) Date of Patent: Sep. 27, 2016

(54) METHOD OF MANUFACTURING SPLINE TELESCOPIC SHAFT

(71) Applicants: JTEKT CORPORATION, Osaka-shi, Osaka (JP); KOYO MACHINE INDUSTRIES CO., LTD., Yao-shi, Osaka (JP)

(72) Inventors: Naoto Miyawaki, Yamatokoriyama (JP); Kenji Higashi, Tenri (JP); Masanori Kobayashi, Kitakatsuragi-gun (JP); Shoji Sasaki, Habikino (JP); Seijun Inoue, Kizugawa (JP); Yoshinobu Ogura, Osaka (JP)

(73) Assignees: JTEKT CORPORATION, Osaka (JP); KOYO MACHINE INDUSTRIES CO., LTD., Osaka (JP)

( * ) Notice: Subject to any disclaimer, the term of this patent is extended or adjusted under 35 U.S.C. 154(b) by 142 days.

(21) Appl. No.: 14/161,179

(22) Filed: Jan. 22, 2014

(65) Prior Publication Data
US 2014/0212593 A1    Jul. 31, 2014

(30) Foreign Application Priority Data

Jan. 25, 2013 (JP) ................. 2013-011851

(51) Int. Cl.
| | |
|---|---|
| *B05D 1/18* | (2006.01) |
| *B62D 1/20* | (2006.01) |
| *F16C 33/20* | (2006.01) |
| *F16D 3/06* | (2006.01) |
| *F16C 3/035* | (2006.01) |
| *F16D 1/02* | (2006.01) |
| *B05D 7/22* | (2006.01) |
| *B05D 1/40* | (2006.01) |

(52) U.S. Cl.
CPC ............. *B05D 1/18* (2013.01); *F16C 3/035* (2013.01); *F16C 33/208* (2013.01); *F16D 3/06* (2013.01); *B05D 1/40* (2013.01); *B05D 7/22* (2013.01)

(58) Field of Classification Search
CPC .......................................................... B05D 1/18
USPC ....................................................... 427/430.1
See application file for complete search history.

(56) References Cited

U.S. PATENT DOCUMENTS

| | | | |
|---|---|---|---|
| 2005/0214445 A1* | 9/2005 | Wajda ................. | C23C 16/52 427/8 |
| 2011/0034256 A1* | 2/2011 | Tokioka ................. | 464/162 |

FOREIGN PATENT DOCUMENTS

| | | |
|---|---|---|
| EP | 2281731 A2 | 2/2011 |
| JP | A-2001-038561 | 2/2001 |
| JP | 2011-252581 A | 12/2011 |

OTHER PUBLICATIONS

Aug. 17, 2015 Extended Search Report issued in European Patent Application No. 14151552.8.

*Primary Examiner* — Gordon R Baldwin
*Assistant Examiner* — Christina McClure
(74) *Attorney, Agent, or Firm* — Oliff PLC

(57) ABSTRACT

A method of manufacturing a spline telescopic shaft, includes a sliding step of sliding in an axial direction an inner shaft manufacturing intermediate member and an outer shaft manufacturing intermediate member, in one of which a resin coating is disposed on splines. In the sliding step, a sliding load of the inner shaft manufacturing intermediate member and the outer shaft manufacturing intermediate member is detected, and sliding is ended at a timing when the detected sliding load reaches a threshold load which is determined based on an initial sliding load detected at a start of the sliding.

6 Claims, 6 Drawing Sheets

METHOD OF MANUFACTURING SPLINE TELESCOPIC SHAFT

BACKGROUND

The present invention relates to a method of manufacturing a spline telescopic shaft.

JP-A-2011-38561 discloses that an inner shaft manufacturing intermediate member having male splines on which a first resin coating is formed, and an outer shaft manufacturing intermediate member in which female splines are formed are forcibly reciprocally slid in the axial direction under given conditions, to transfer a part of the resin material of the first resin coating to the female splines of the outer shaft manufacturing intermediate member, thereby forming a second resin coating.

Conditions that the sliding load in the axial direction is not larger than a predetermined value, and that the play in the rotation direction is not larger than a predetermined amount are sometimes set as performances required in a spline telescopic shaft which is used as, for example, a steering shaft or intermediate shaft in a vehicle.

Usually, there is a tendency that, when the sliding load is excessively reduced, the play in the rotation direction is large, and, when the play in the rotation direction is excessively reduced, conversely, the sliding load is large. Namely, it is difficult that the two performances are compatible.

It is assumed that the sliding step disclosed in JP-A-2011-38561 is performed under given conditions (for examples, conditions that the sliding step is ended at a timing when the sliding load reaches a predetermined level). In this case, when spline telescopic shafts are mass-produced, there is a possibility that one of the two performances (the sliding load and the play) becomes faulty due to a failure of the tooth profiles of the splines, thereby causing the failure rate to be high.

SUMMARY

It is an object of the invention to provide a method of manufacturing a spline telescopic shaft in which the failure rate is low.

In order to achieve the object, according to the invention, there is provided a method of manufacturing a spline telescopic shaft, the method comprising a sliding step of sliding in an axial direction an inner shaft manufacturing intermediate member and an outer shaft manufacturing intermediate member, in one of which a resin coating is disposed on splines, wherein, in the sliding step, a sliding load of the inner shaft manufacturing intermediate member and the outer shaft manufacturing intermediate member is detected, and sliding is ended at a timing when the detected sliding load reaches a threshold load which is determined based on an initial sliding load detected at a start of the sliding.

When the threshold load is W1 and the initial sliding load is W0, the threshold load W1 may be obtained by using a monotonic increasing function in which the initial sliding load W0 is set as a parameter.

The threshold load W1 may be obtained by using a following linear function expression: $W1=A \cdot W0+B$ where A and B are constants, and the initial sliding load W0 is the parameter.

The constant B may be increased or decreased in accordance with a degree of a slide stroke L of the inner shaft manufacturing intermediate member and the outer shaft manufacturing intermediate member in the sliding step.

The constant B may be proportional to the slide stroke L.

DETAILED DESCRIPTION OF EXEMPLARY EMBODIMENTS

A preferred embodiment of the invention will be described with reference to the accompanying drawings.

Figure 1:
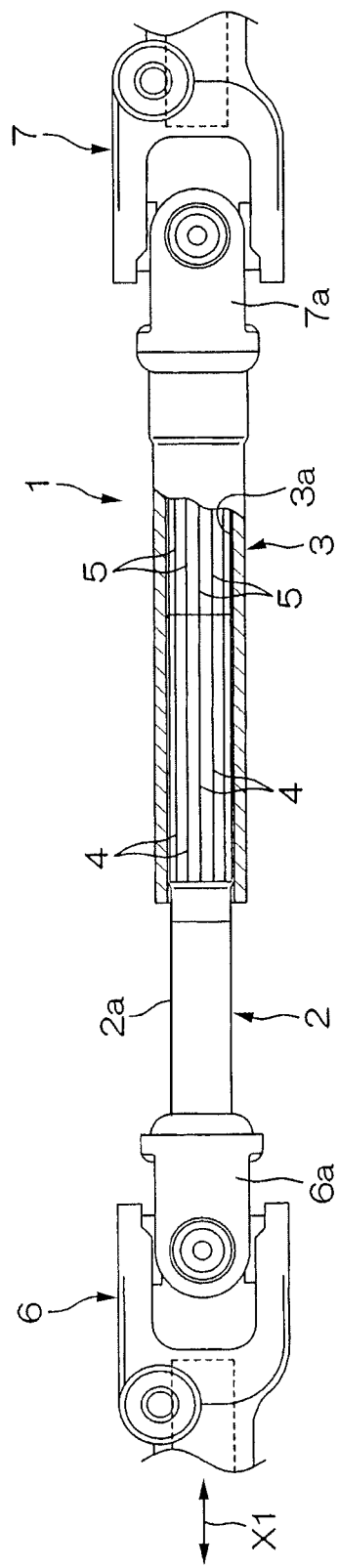
FIG. 1 is a partially sectional side view of a spline telescopic shaft which is produced by a manufacturing method of an embodiment of the invention.

FIG. 1 is a partially sectional side view of a spline telescopic shaft 1 which is produced by a manufacturing method of an embodiment of the invention. For example, the spline telescopic shaft 1 is sometimes used as an intermediate shaft which is interposed between a steering shaft (not shown) and a pinion shaft (not shown) of a rack and pinion mechanism. Alternatively, the spline telescopic shaft 1 may be used as a steering shaft which contracts when absorbing a shock.

The spline telescopic shaft 1 includes an inner shaft 2 and tubular outer shaft 3 which are fitted to each other. The inner shaft 2 and the outer shaft 3 are spline-fitted to each other in a slidable and torque-transmittable manner along the axial direction X1.

A plurality of male splines 4 are disposed on the outer peripheral surface 2a of the inner shaft 2, and a plurality of female splines 5 which alternately mesh with the male splines 4 are disposed on the inner peripheral surface 3a of the outer shaft 3. In FIG. 1, the splines 4, 5 are diagrammatically shown.

In the case where the spline telescopic shaft 1 constitutes an intermediate shaft, as shown in FIG. 1, one yoke 6a of a universal joint 6 is integrally attached to one end of the inner shaft 2. One yoke 7a of a universal joint 7 is integrally attached to one end of the outer shaft 3.

Figure 2:
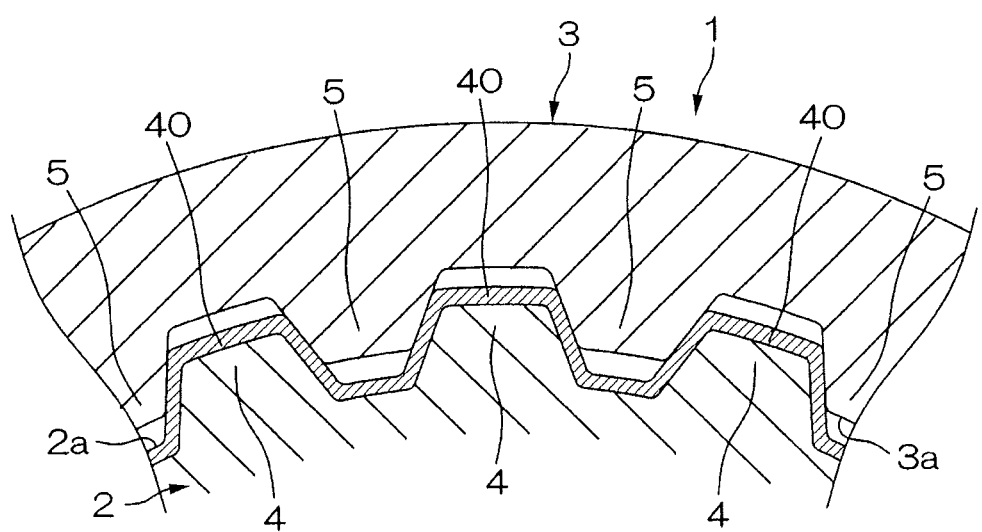
FIG. 2 is a sectional view of main portions of the spline telescopic shaft.

As shown in FIG. 2, a resin coating 40 is formed on the surfaces of the male splines 4. The resin coating 40 is formed by using a synthetic resin. Examples of the synthetic resin are a thermo plastic resin such as polyimide or polyacetal, and a thermo setting resin such as an epoxy resin.

Figure 3A:
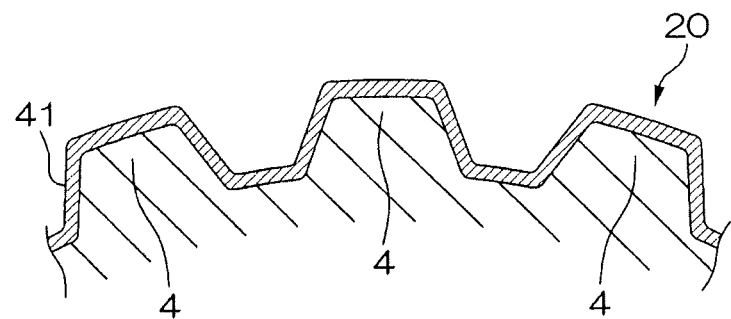
FIG. 3A is a schematic sectional view of an inner shaft manufacturing intermediate member which is coated by a resin coating.
Figure 3B:
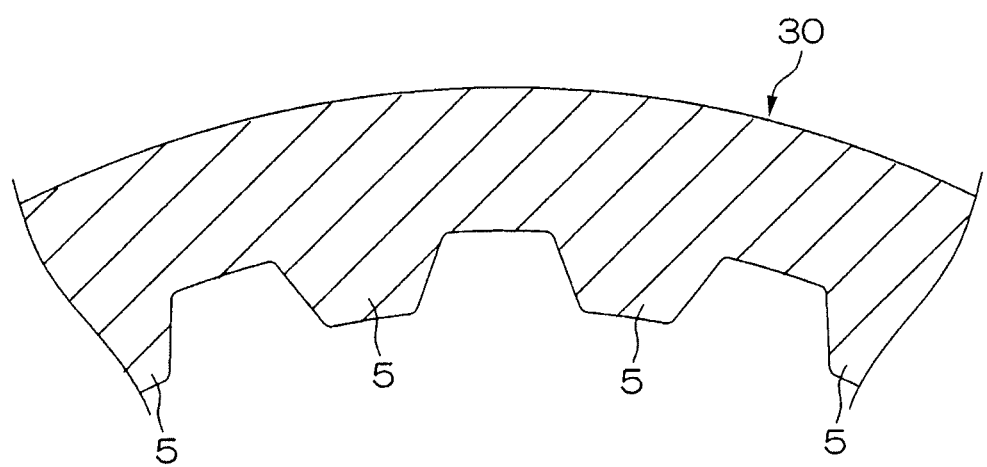
FIG. 3B is a schematic sectional view of an outer shaft manufacturing intermediate member.

An inner shaft manufacturing intermediate member 20 in which a resin coating 41 is formed on the surfaces of the male splines 4 as shown in FIG. 3A, and an outer shaft manufacturing intermediate member 30 which has the female splines 5 as shown in FIG. 3B, and which is configured only by a metal are fitted to each other with a negative fitting space. Namely, the inner shaft manufacturing intermediate member 20 is press fit into the outer shaft manufacturing intermediate member 30.

Figure 4:
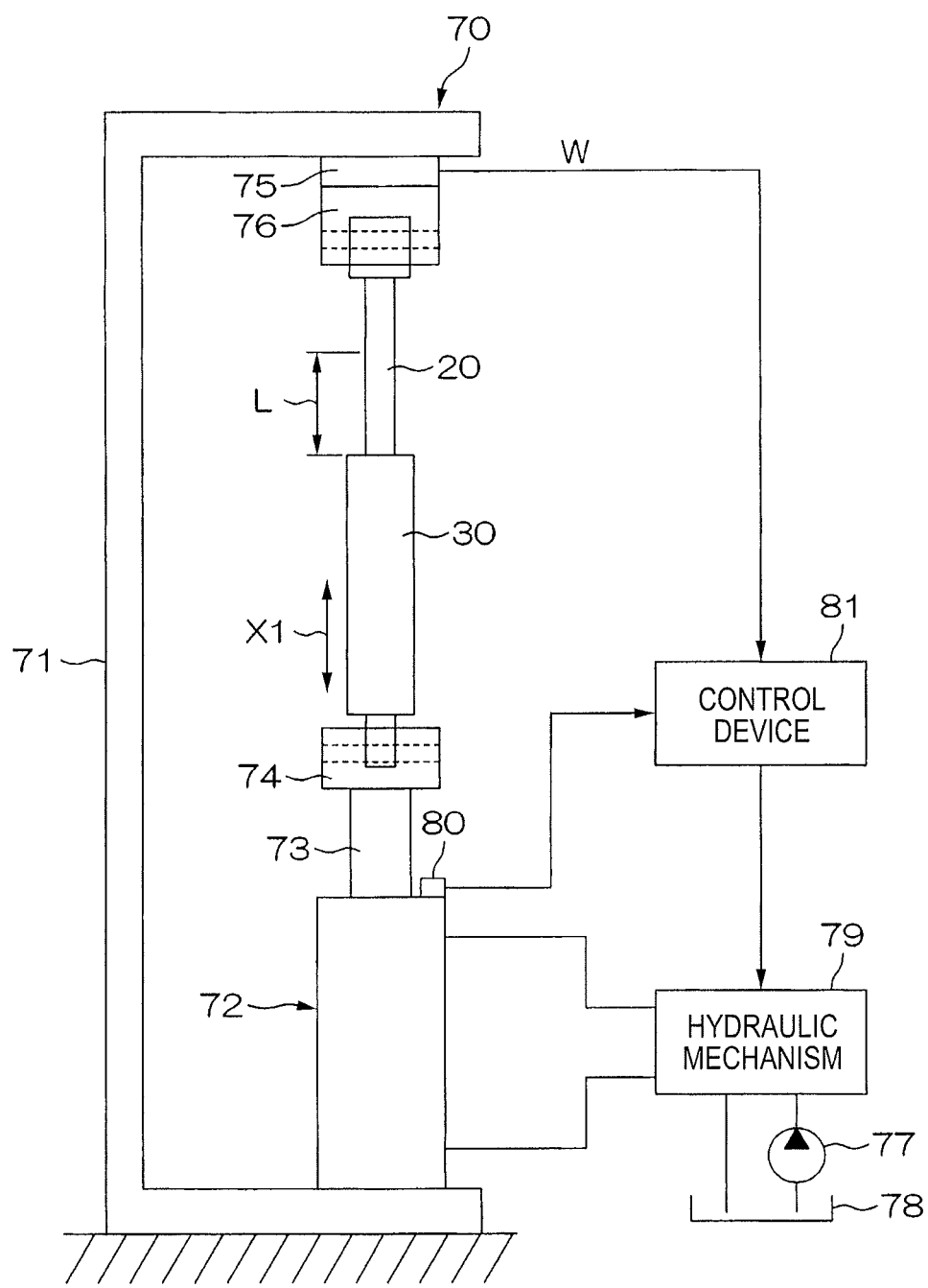
FIG. 4 is a diagram of a vibrating apparatus which is used in a sliding step.

Then, the manufacturing intermediate members 20, 30 are attached to a vibrating apparatus 70 shown in FIG. 4, and the shaped resin coating 40 is obtained through a sliding step in which the inner shaft manufacturing intermediate member 20 and the outer shaft manufacturing intermediate member 30 are forcibly slid in the axial direction X1. At the time when the manufacturing intermediate members 20, 30 are forcibly slid, a torsional torque may be applied or may not be applied between the manufacturing intermediate members 20, 30.

The vibrating apparatus 70 which is used in the sliding step includes: a stationary frame 71; a vibration actuator 72 (for example, a hydraulic cylinder) which is fixed to one end of the stationary frame 71; an extendable rod 73 which is extended from or contracted toward the vibration actuator 72; a first attachment bracket 74 which is attached to the tip end of the extendable rod 73; and a second attachment bracket 76 which is fixed to the other end of the stationary frame 71 via a load sensor 75.

Hydraulic fluid is supplied to the vibration actuator 72 via a hydraulic mechanism 79 which is connected to a hydraulic pump 77 and a hydraulic tank 78, whereby the extendable rod 73 is extended or contracted.

For example, one end of the outer shaft manufacturing intermediate member 30 is attached to the first attachment bracket 74 in the one end of the extendable rod 73 of the vibration actuator 72, and one end of the inner shaft manufacturing intermediate member 20 is fixed to the second attachment bracket 76 which is fixed to the load sensor 75.

A position sensor 80 which detects the stroke position of the extendable rod 73 is disposed on the vibration actuator 72. The detection signals of the load sensor 75 and the position sensor 80 are supplied to a control device 81. Based on position information obtained by the position sensor 80 and speed information which is obtained by differentiating the position information, the control device 81 supplies a control signal to the hydraulic mechanism 79 to cause the extendable rod 73 to be extracted and contracted at a predetermined stroke and a predetermined rate.

Moreover, the control device 81 receives the detection signal of the load sensor 75, detects a sliding load W based on the peak value of each vibration cycle, and, at the timing when the sliding load W satisfies predetermined conditions, ends the sliding step using the vibration actuator 72.

Figure 5:
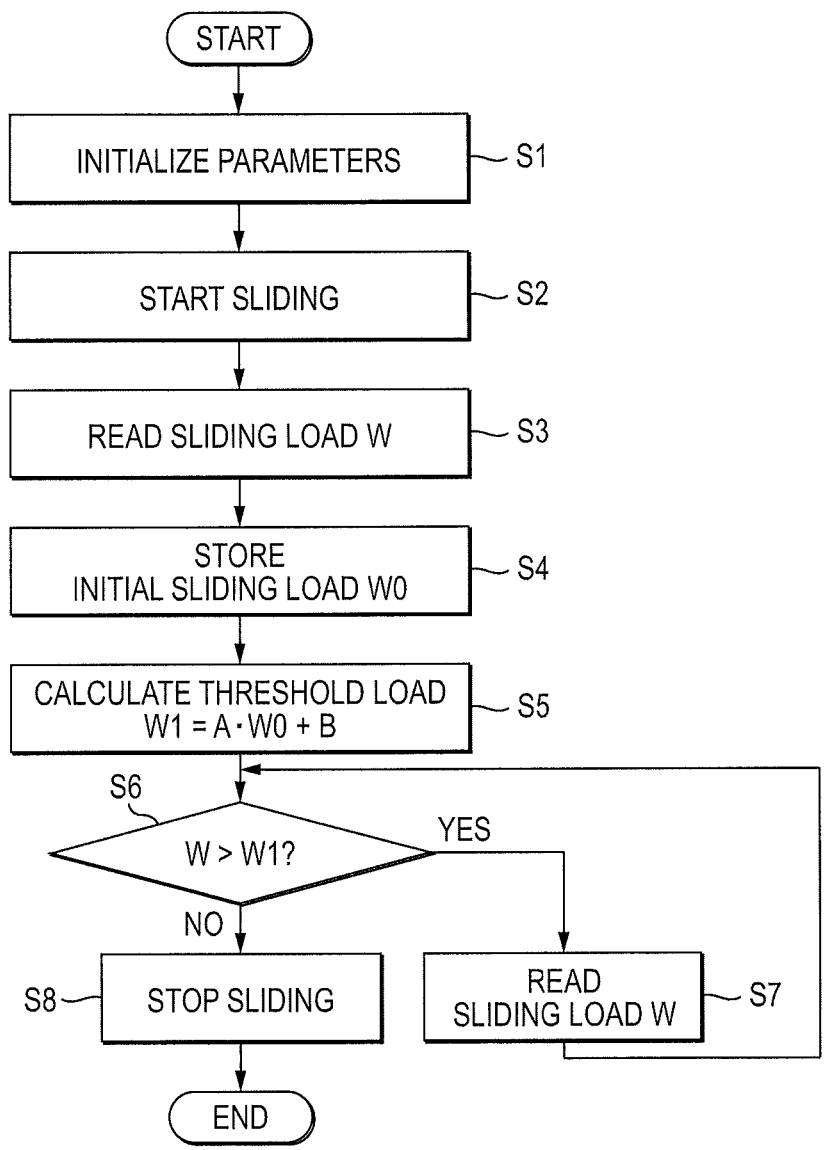
FIG. 5 is a flowchart of a control flow of controlling the vibrating apparatus.
Figure 6:
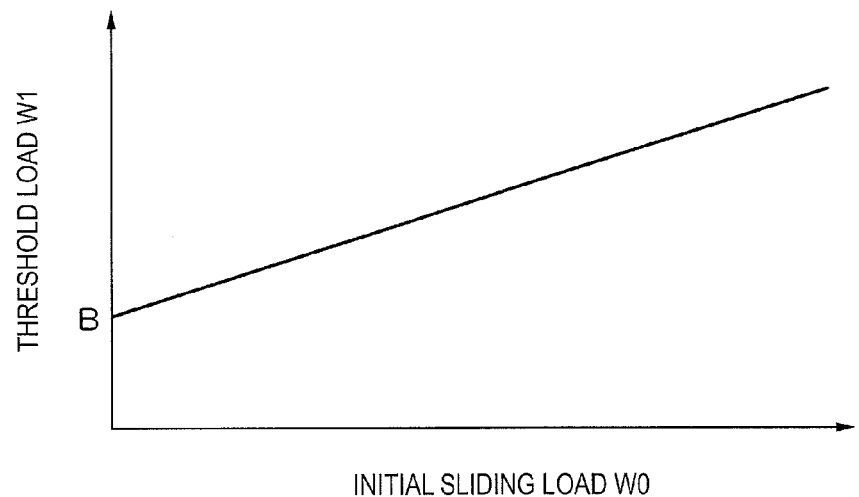
FIG. 6 is a graph showing a relationship between an initial sliding load W0 and a threshold load W1 at which the sliding step is ended.

As shown in the flowchart of FIG. 5, specifically, parameters are initialized in step S1 upon activation of the system, and then the vibration actuator 72 is driven in step S2 to start the sliding.

In step S3, the control device 81 reads the sliding load W which is detected by the load sensor 75 immediately after the start of the sliding, and, in step S4, stores the read sliding load W as an initial sliding load W0.

In step S5, then, a threshold load W1 (kN) is calculated by using following linear function expression (1) based on the initial sliding load W0.

$$W1 = A \cdot W0 + B \qquad (1)$$

Then, it is determined in step S6 whether the sliding load W is larger than the threshold load W1 or not. If the sliding load W is larger than the threshold load W1 (YES in step S6), the system proceeds to step S7 to read the sliding load W.

The processes of steps S6 and S7 are repeated until the sliding load W which is detected in step S7 is equal to or smaller than the threshold load W1 (W≤W1). If the detected sliding load W is equal to or smaller than the threshold load W1 (NO in step S6), the system proceeds to step S8 to stop the sliding, thereby ending the process.

In the sliding step, without using external heating, the tooth profiles of the shafts 2, 3 are formed only by frictional heat generated by sliding of the inner shaft manufacturing intermediate member 20 and the outer shaft manufacturing intermediate member 30. Namely, a part of the resin material of the resin coating 41 of the inner shaft manufacturing intermediate member 20 is mutually rubbed with sliding regions of the female splines 5 of the outer shaft manufacturing intermediate member 30, whereby the resin coating 41 is formed as the resin coating 40 to complete the inner shaft 2. Moreover, the tooth profiles of the female splines of the outer shaft manufacturing intermediate member 30 are shaped by the mutual rubbing to complete the outer shaft 3.

According to the embodiment, the sliding load W of the manufacturing intermediate members 20, 30 is detected, and the sliding is ended at the timing when the detected sliding load W reaches the threshold load W1 which is determined based on the initial sliding load W0 detected at the start of the sliding. Irrespective of dispersion of individuals of the manufacturing intermediate members 20, 30, therefore, the tooth profiles of the splines 4, 5 can be satisfactorily adapted to each other by matching of actual articles, with the result that, after completion, the spline telescopic shaft 1 in which the sliding load is small and the play is small can be realized in a state where the failure rate is low.

Figure 7:
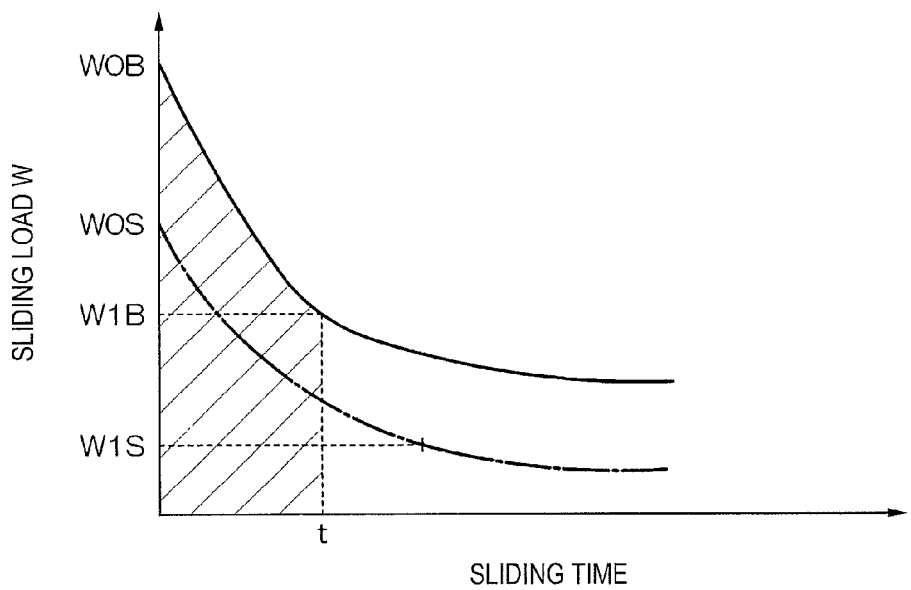
FIG. 7 is a graph showing a temporal change of a sliding load in the sliding step.

The threshold load W1 at which the sliding step is to be ended is determined based on the initial sliding load W0 because of the following reason. Usually, the amount of heat per unit area and time which is generated when two members are slid against each other while being in contact with each other is proportional to the product of the coefficient of friction between the contact surfaces of the two members, the surface pressure at the contact surfaces, and the slip speed. When the relationship is applied to the embodiment, it seems that the amount of heat per unit area and time which is generated due to the sliding adaptability is proportional to the product of the sliding load (corresponding to the product of the coefficient of friction and surface pressure which are described above) and the slip speed. According the findings of the inventors, it was found that the sliding load is reduced with the elapse of time as shown in FIG. 7. For example, it seems that the total of the amount of heat which is generated after the start of the sliding at an initial sliding load W0B and until the elapse of a sliding time t is proportional to the area of the hatched region in FIG. 7.

Considering the above, the case where the initial sliding load W0 at the start of the sliding in the sliding step is large is compared with that where the initial sliding load is small. In the former case where the initial sliding load is W0B or large as indicated by the solid line in FIG. 7, the amount of frictional heat generated by the sliding is great. Even when the sliding is ended at the timing when the detected sliding load W is reduced to the threshold load W1B which is relatively large, therefore, it is possible to obtain an amount of heat (amount of energy) which is required to satisfactorily form the tooth profiles of the splines 4, 5.

In the latter case where the initial sliding load is W0S or small as indicated by the dash-dot line in FIG. 7, by contrast, the amount of frictional heat generated by the sliding is small, and therefore an amount of heat (amount of energy) which is required to satisfactorily form the tooth profiles of the splines 4, 5 can not be obtained without the sliding step continued for a long period until the timing when the detected sliding load W is reduced to the threshold load W1S which is relatively small.

When A and B are set as constants, and the threshold load W1 is obtained from the initial sliding load W0 by using the linear function expression W1=A·W0+B, moreover, the threshold load W1 and the initial sliding load W0 can be provided with linearity. Therefore, a sliding step adequate for each individual can be realized.

In the linear function expression (1), the constant B may be increased or decreased in accordance with the degree of the slide stroke L of the manufacturing intermediate members 20, 30 in the sliding step. In an individual in which the slide stroke L is relatively long, the generated frictional heat is relatively large, and hence an amount of heat (amount of energy) which is required to satisfactorily form the tooth profiles of the splines 4, 5 can be obtained even when the sliding is ended at the timing when the detected sliding load W reaches the threshold load W1 which is relatively large.

In an individual in which the slide stroke L is relatively short, by contrast, the generated frictional heat is relatively small, and hence an amount of heat (amount of energy) which is required to satisfactorily form the tooth profiles of the splines 4, 5 can be obtained only after the sliding step is continued for a relatively long period until the timing when the detected sliding load W reaches the threshold load W1 which is relatively small.

In the linear function expression (1), more specifically, the constant B may be proportional to the slide stroke L. In the case where the constant B in an individual having the slide stroke L is known, therefore, a constant B1 which is preferable in an unknown individual having the slide stroke L1 can be obtained by a calculation using following proportional expression (2).

$$B1=(L1/L)\cdot B \quad (2)$$

When the proportional expression (2) is used, it is possible to anticipate the unknown constant B1 which has not been experimentally obtained. Therefore, a sliding step adequate for each individual can be easily realized.

In the embodiment, the threshold load W1 is obtained by using the linear function expression (1). The useful expression is not limited to a linear function expression. The threshold load W1 may be obtained by using a monotonic increasing function in which the initial sliding load W0 is set as a parameter (for example, a quadratic function W1=C·W0$^2$+D·W0+E where C, D, and E are constants). According to this, when the initial sliding load W0 is relatively large, the threshold load W1 can be made relatively large, and, when the initial sliding load W0 is relatively small, the threshold load W1 can be made relatively small.

The invention is not limited to the embodiment which has been described above. In the embodiment, for example, the resin coating 41 is disposed on the inner shaft manufacturing intermediate member 20. Alternatively, a resin coating may be disposed on the outer shaft manufacturing intermediate member. Moreover, various changes can be made within the scope of the appended claims.

As a result of intensive investigations, the inventors found the followings. When the case where the initial sliding load at a timing when sliding is started in the sliding step is large is compared with that where the initial sliding load is small, the amount of frictional heat generated by the sliding is great in the former case where the initial sliding load is large. Even when the sliding is ended at a timing when the detected sliding load is reduced to a threshold load which is relatively large, therefore, it is possible to obtain an amount of heat (amount of energy) which is required to satisfactorily form the tooth profiles of the splines. In the latter case where the initial sliding load is small, by contrast, the amount of frictional heat generated by the sliding is small, and therefore an amount of heat (amount of energy) which is required to satisfactorily form the tooth profiles of the splines can be obtained only after the sliding step is continued for a relatively long period until a timing when the detected sliding load is reduced to a threshold load which is relatively small.

According to an aspect of the invention, the sliding load of the manufacturing intermediate members is detected, and the sliding is ended at a timing when the detected sliding load reaches the threshold load which is determined based on the initial sliding load detected at the start of the sliding. Irrespective of dispersion of individuals of the manufacturing intermediate members, therefore, the tooth profiles of the splines can be satisfactorily adapted to each other by matching of actual articles, with the result that a spline telescopic shaft in which the sliding load is small and the play is small can be realized.

According to an aspect of the invention, the threshold load W1 is expressed by a monotonic increasing function in which the initial sliding load W0 is set as a parameter, so that, when the initial sliding load W0 is relatively large, the threshold load W1 can be made relatively large, and, when the initial sliding load W0 is relatively small, the threshold load W1 can be made relatively small.

According to an aspect of the invention, A and B are set as constants, and the linear function expression W1=A·W0+B is used, whereby the threshold load W1 and the initial sliding load W0 can be provided with linearity. Therefore, a sliding step adequate for each individual can be realized.

According to an aspect of the invention, the constant B is increased or decreased in accordance with the degree of the slide stroke L of the manufacturing intermediate members, and therefore a sliding step adequate for each individual can be realized. In an individual in which the slide stroke is relatively long, the generated frictional heat is relatively large, and hence an amount of heat (amount of energy) which is required to satisfactorily form the tooth profiles of the splines can be obtained even when the sliding is ended at a timing when the detected sliding load reaches a threshold load which is relatively large. In an individual in which the slide stroke is relatively short, by contrast, the generated frictional heat is relatively small, and hence an amount of heat (amount of energy) which is required to satisfactorily form the tooth profiles of the splines can be obtained only after the sliding step is continued for a relatively long period until a timing when the detected sliding load reaches a threshold load which is relatively small.

According to an aspect of the invention, in the case where the constant B in an individual having the slide stroke L is known, the constant B1 in an individual having the slide stroke L1 can be obtained by a calculation using a proportional expression B1=(L1/L)·B. The unknown constant B1 which has not been experimentally obtained can be anticipated. Therefore, a sliding step adequate for each individual can be easily realized.

What is claimed is:

1. A method of manufacturing a spline telescopic shaft, the method comprising:

sliding an inner shaft manufacturing intermediate member and an outer shaft manufacturing intermediate member in an axial direction, at least one of the inner shaft manufacturing intermediate member and the outer shaft manufacturing intermediate member has splines having a resin coating;

detecting an initial sliding load when the sliding step begins;

determining a threshold load based on the initial sliding load, wherein the threshold load increases as the initial sliding load increases;

during the sliding step, detecting a sliding load of the inner shaft manufacturing intermediate member and the outer shaft manufacturing intermediate member;

terminating the sliding step to form the spline telescopic shaft when the detected sliding load reaches the threshold load.

2. The method according to claim 1, wherein, when the threshold load is W1 and the initial sliding load is W0, the threshold load W1 is obtained by using a monotonic increasing function in which the initial sliding load W0 is set as a parameter.

3. The method according to claim 2, wherein the threshold load W1 is obtained by using a following linear function expression:

W1=A·W0+B, where A and B are constants, and the initial sliding load W0 is the parameter.

4. The method according to claim 3, wherein the constant B is increased or decreased in accordance with a degree of a slide stroke L of the inner shaft manufacturing intermediate member and the outer shaft manufacturing intermediate member in the sliding step.

5. The method according to claim 4, wherein the constant B is proportional to the slide stroke L.

6. The method according to claim 1, further comprising repeating the step of detecting the sliding load until the threshold load is reached.

* * * * *